Patented Nov. 14, 1950

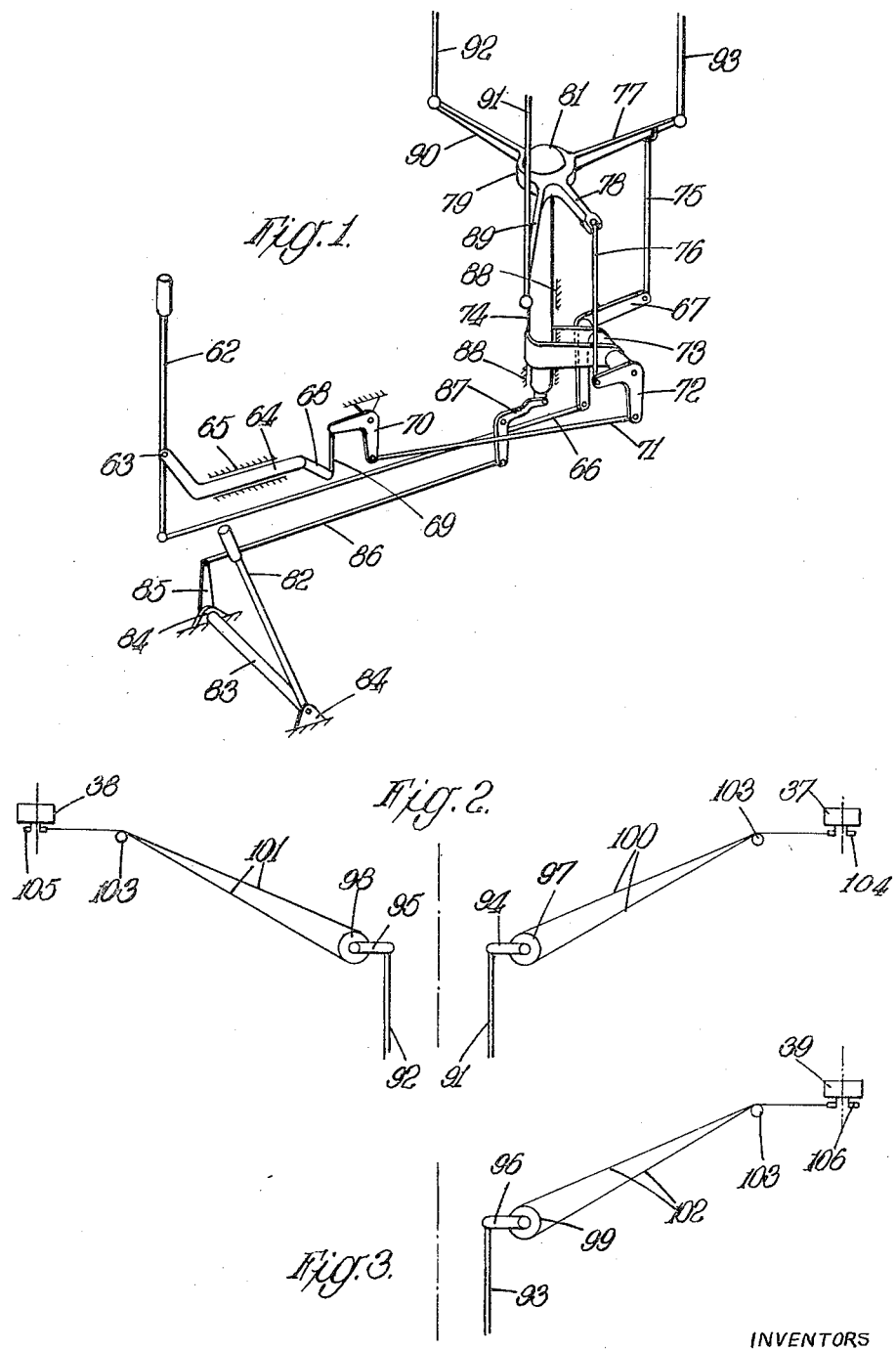

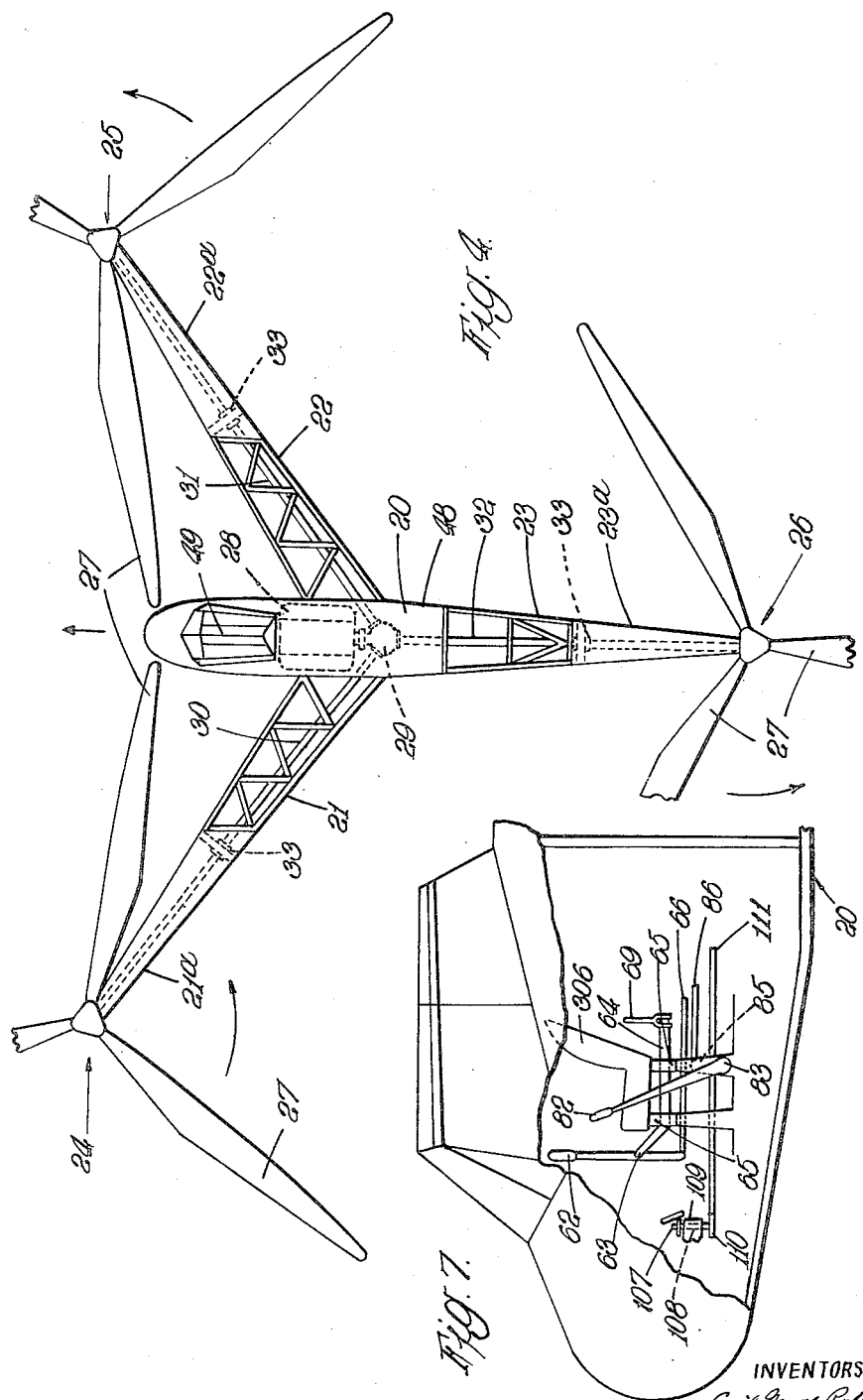

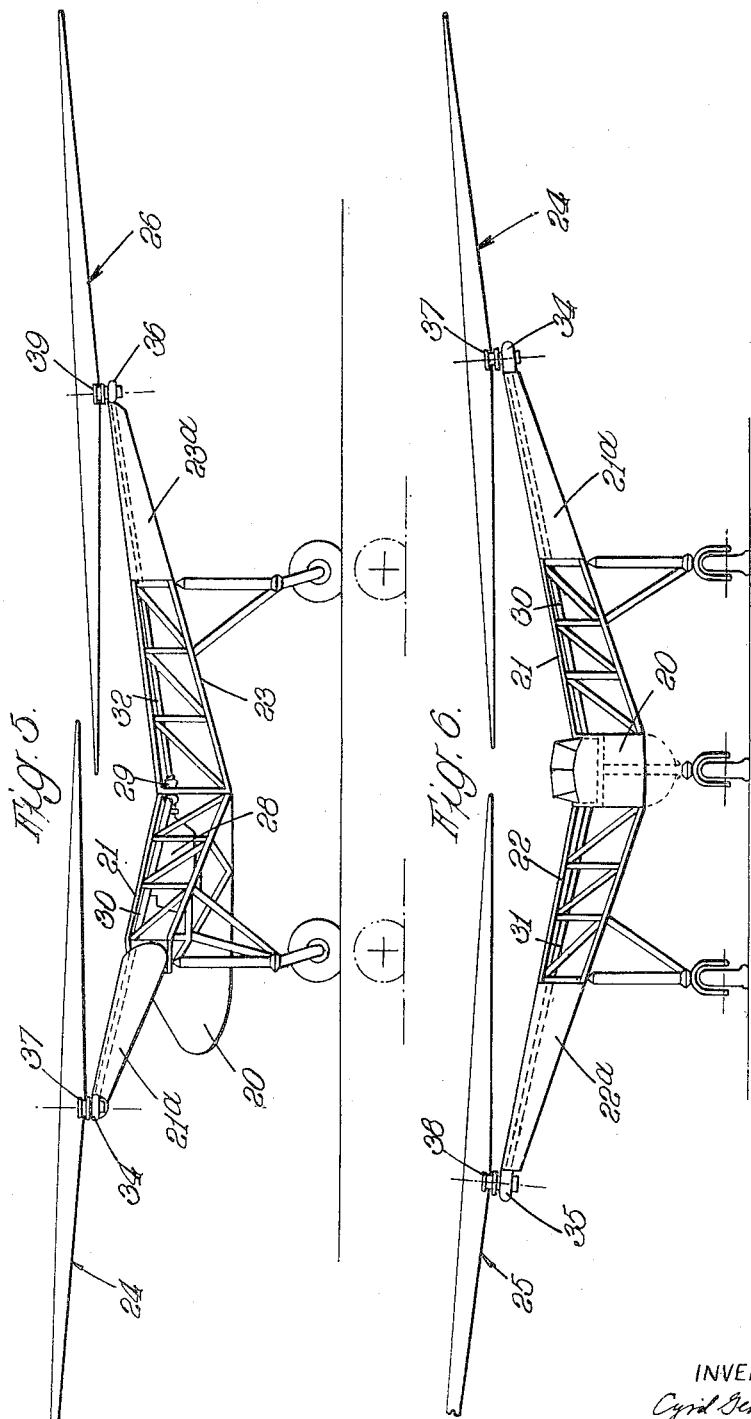

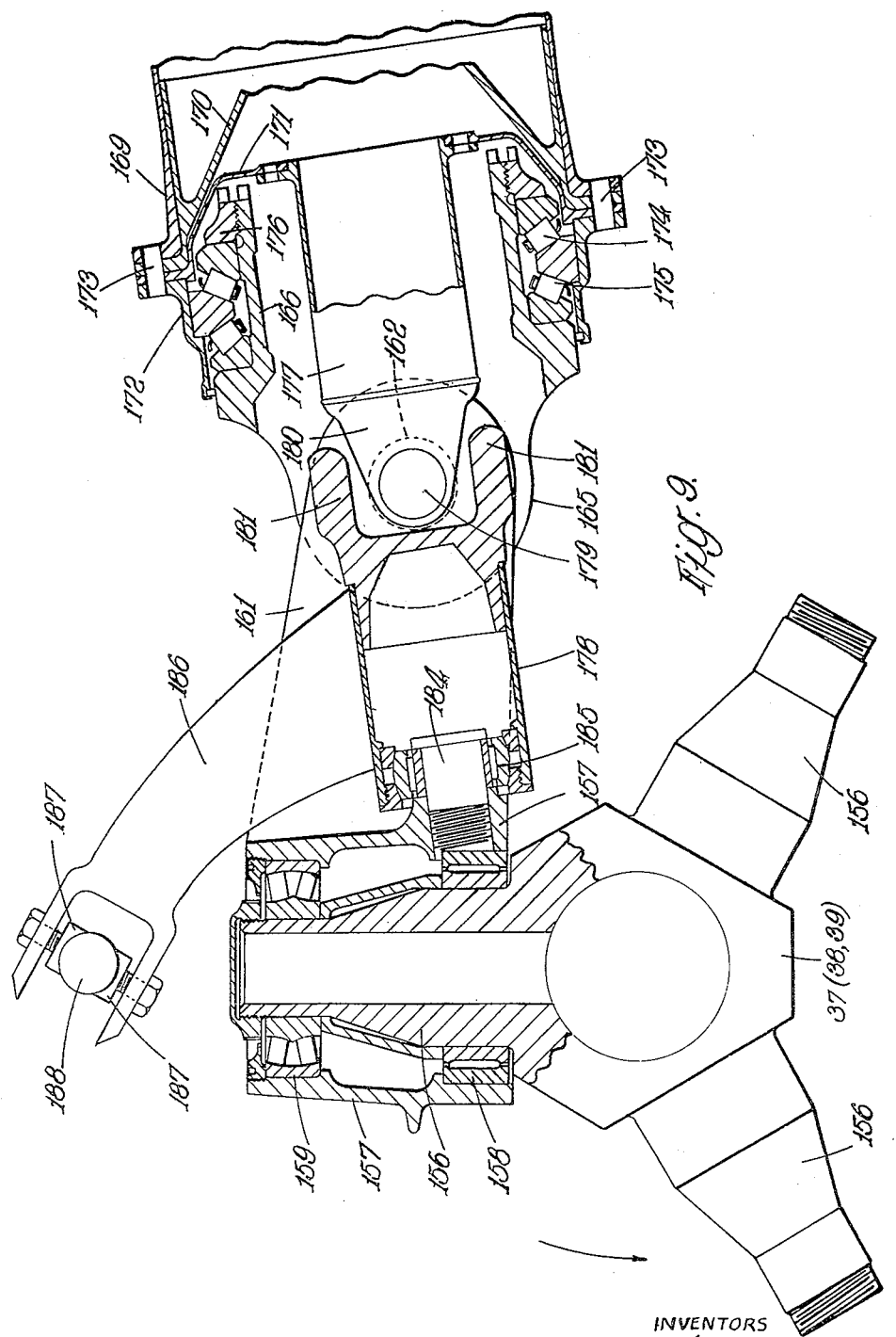

2,529,629

UNITED STATES PATENT OFFICE 2,529,629

ROTARY-WING AIRCRAFT WITH PLURAL ROTORS

Cyril George Pullin, Tadburn, Ampfield, and Kenneth Watson, Woolston, Southampton, England, assignors, by mesne assignments, to Autogiro Company of America, Philadelphia, Pa., a corporation of Delaware Application July 26, 1947, Serial No. 763,858
In Great Britain July 30, 1946

3 Claims. (Cl. 244—17.23)

1

The object of this invention is an improvement in flight-control means for multi-rotor helicopters, rotaplanes or like rotary-winged aircraft, having three or more lifting or sustaining rotors with vertical axes, that are approximately parallel and spaced from one another in plan, and means for controlling the magnitude of the lift-forces of all the rotors, either differentially to produce variable pitching and rolling moments or collectively for varying the rate of vertical ascent or descent. In the particular case in which the lift-forces are to be varied by varying the pitch angles of the individual rotors, collective control of all the rotors together may also be used, in a helicopter, for altering the "mean" or "collective" pitch angles of the individual rotors from a "helicopter" value, required for power driven flight, to an "autorotative" value, required when the power is shut-off.

The flight-control means of such an aircraft, according to this invention, comprise, in combination with a conventional control column or/and independent trimming control members for pitching and rolling control, a spider or like member which can be tilted about any horizontal axis and has as many arms or linkage pick-up points as there are rotors, which arms or pick-up points are disposed in plan in corresponding relationship to the lines joining the several rotor centres to the c. g. of the aircraft, independent control circuits operated by the control column or/and the independent trimming control members for displacing the spider or like member in the pitching and rolling planes respectively, each of said spider arms or pick-up points being connected to means for varying the lift of the corresponding rotor in such a way that the control system is "isotropic," in the sense that a given inclination of the spider or like member in any vertical plane displaces the resultant lift vector of all the rotors, in that plane, through the same horizontal distance, without altering its magnitude. Preferably the spider or like member can be raised and lowered bodily and its connections with the lift-varying means of the rotors are such that bodily raising or lowering of the spider or like member alters the magnitude of the resultant lift vector of all the rotors without displacing it; and a separate control member, corresponding in function to the conventional "pitch-lever" or "throttle-lever," operates an independent control circuit for raising and lowering the spider or like member.

The nature of the invention will be better understood from the following description with reference to the drawings, which illustrate a specific example in which the invention is applied to a three-rotor helicopter with collective pitch control of each of the three rotors. In the drawings, Figs. 1 and 3 are somewhat diagrammatic representations of the control circuits, Fig. 1 being a perspective view of the "cockpit ends" of the circuits, and Figs. 2 and 3 being front and side elevations of the "rotor ends" of the circuits.

Figs. 4 to 6 are general arrangement views of a helicopter embodying the invention, in plan, side and front elevations respectively;

Fig. 7 shows the forward part of the body, partly "cut-away," in side elevation on an enlarged scale;

Fig. 9 is a plan, partly sectioned, of a rotor hub, showing one blade root assembly attached.

Figure 8:
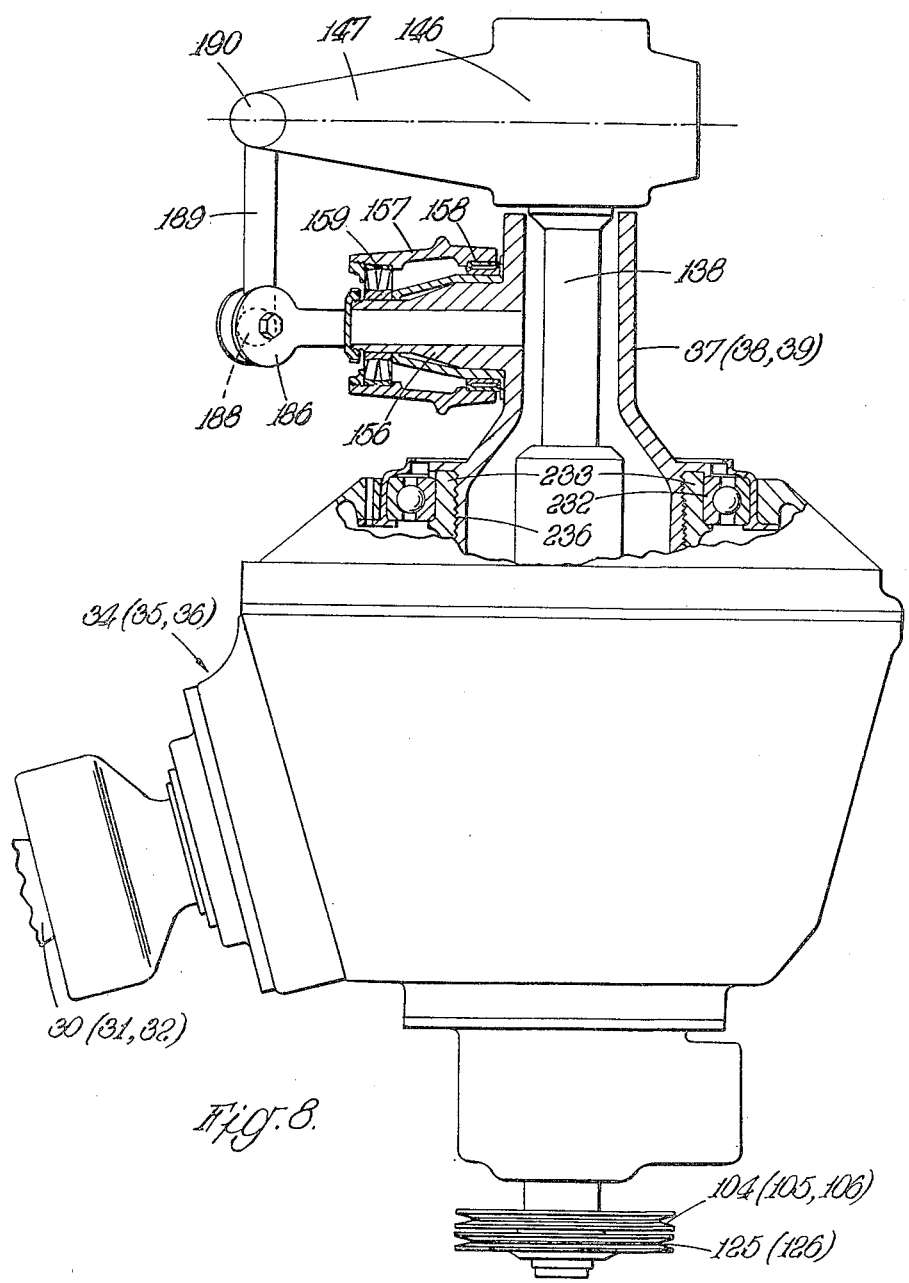
Fig. 8 is a part-sectional elevation of the hub assembly of one rotor.

Referring to Figs. 1 to 3, it will be seen that the control column 62 is pivoted at 63 for fore and aft movement on a rocking shaft 64 supported in bearing 65. Fore and aft movement of the control column is transmitted by means of a push-pull rod 66 to the vertical arm of a bell-crank 67; and lateral movement of the control column is transmitted by the rocking shaft 64 and a crank 68 fixed thereto, through a link 69, a bell-crank 70 and a push-pull rod 71, to the vertical arm of a bell-crank 72. The bell-cranks 67, 72 are pivoted on a bracket 73 secured to a vertical pillar 74, and their horizontal arms are respectively connected by vertical links 75 and 76 with arms 77 and 78 of a horizontal spider 79, the arm 77 being fore and aft and rearwardly directed and the arm 78 being at right angles to arm 77 and directed to port. The spider is mounted concentrically on pillar 74 by means of a universal joint 81 (here shown as a ball joint, which will be provided with means (not shown) preventing rotation of the spider) and it will be seen that the linkage described transmits fore and aft and lateral rocking of the control column to the spider, so that the latter repeats the angular displacements of the control column.

The "pitch-change" lever 82 is mounted on a transverse rocking shaft 83 supported in bearings 84 and carrying a crank 85 which is connected by a push-pull rod 86 to the vertical arm of a bell-crank 87, whose horizontal arm is connected to the pillar 74, which slides vertically in guides 88. Operation of the pitch-change lever thus raises and lowers the spider 79 bodily.

The spider 79 has two other horizontal arms 89 and 90 disposed at angles of 120° with arm 77 and with one another. The arms 89, 90, 77 are connected at equal radii from the centre of the spider with vertical links 91, 92, 93 whose other ends are respectively connected to cranks 94, 95 and 96, operating pulleys 97, 98 and 99, which carry cables 100, 101 and 102 respectively. The latter are led over jockey pulleys 103 and operate pulleys 104, 105 and 106 coaxial with the several rotor hubs 37, 38, 39. These pulleys operate the collective pitch control mechanisms of the several rotors. It will be seen that raising or lowering of the spider 79 in response to operation of the pitch change lever 82 applies equal rotations in the same sense to all three pulleys 104, 105, 106 to vary the collective pitch angles of all the rotors in the same sense; and that rocking of the spider on its universal joint in response to movements of the control column applies differential rotations to the pulleys. Fore and aft movement applies equal rotation in the same sense to the pulleys 104 and 105, to increase (or decrease) equally the collective pitch angles of the rotors attached to hubs 37 and 38, and a contrary rotation to the pulley 106, to vary the collective pitch angle of the rotor attached to hub 39 in the opposite sense; and lateral movement applies equal and opposite rotations to pulleys 104 and 105, to apply equal and opposite variations to the collective pitch angles of the rotors attached to hubs 37 and 38, and no rotation to pulley 106.

The mechanism associated with the rotor hubs 37, 38 and 39 and operated by the pulleys 104, 105 and 106 for varying the collective pitch angles of the rotors may conform with that disclosed in copending application Serial No. 686,873, filed July 29, 1946, or may be of other suitable type, but the details of this mechanism are not illustrated herein since they form no part of the present invention per se. The "gearing" of the individual mechanisms will be so selected that equal displacements of links 91—93 produce equal changes of lift, in the same sense, of the several rotors, in "stationary," i. e. hovering or vertical flight. If all three rotors are alike in every respect, the "gearing" of their collective pitch mechanisms will be the same.

The application of the control system described above to a three-rotor helicopter is illustrated in Figs. 4 to 9 of the accompanying drawings. Figs. 4 to 6 illustrate the general arrangement, Fig. 7 shows the cockpit connections of the control circuits, Fig. 8 illustrates one of the rotor hub assemblies and Fig. 9 shows the mounting of a rotor blade on the hub.

Referring to Figs. 4 to 6, the helicopter has a body 20 provided with three out-riggers 21, 22, 23 arranged at angles of 120° in plan, the outrigger 23 being in the fore and aft vertical plane of symmetry of the helicopter whose normal (forward) direction of travel is indicated by an arrow in Fig. 4. The inboard parts 21 to 23, of the outriggers are constructed as lattice girders and their outboard parts 21a, 22a, 23a are of monocoque construction. The outriggers support three identically similar three-bladed rotors 24, 25, 26 having identically similar blades 27; and all three rotors rotate counter-clockwise as seen from above, the directions of rotation being indicated by arrows in Fig. 4. All three rotors are driven by a single engine 28 through distribution gears housed in a distributive gear-box 29 and through "high speed" transmission shafts 30, 31, 32 respectively. The transmission shafts are enclosed in the outriggers with steady bearings 33 for the shafts at about their mid length. At the ends of the outriggers are mounted gearboxes 34, 35, 36 containing speed-reduction gearing through which the hubs 37, 38, 39 of the rotors are driven.

The body proper is covered with a skin 48; the pilot's cabin in the fore part of the body and is indicated at 49 in Fig. 4. The lay-out of the pilot's flying controls and the pilot's seat 306 are shown in Fig. 7.

Referring now to Figs. 8 and 9, each hub 37 (38 or 39), is connected by a screwed joint 236 with a sleeve 233 which is rotatably supported by a bearing 232 in the appropriate gear box 34 (35 or 36) containing gearing by which the drive is transmitted from shaft 30 (31 or 32) to the sleeve 233. The lift of the rotor is transmitted from sleeve 233 to the gear box 34 (35 or 36) through the bearing 232.

The hub 37, 38 or 39 of each rotor has three flapping pivot pins 156, whose axes intersect the hub axis at included angles of 120°. Thus there is no "flapping-pivot offset." Each flapping pivot pin carries a drag link 157 on an inboard needle roller bearing 158 and an outboard double-row self-aligning roller bearing 159. The drag link is forked and its fork-ends 161 support coaxial drag pivot pins 162, on which the forked-ends 165 of a blade root stub 166 are journaled. The blade root, which consists of four elements 169, 170, 171, and 172, bolted together at 173, rotates on the stub 166 for pitch angle variation, being mounted by means of a bearing assembly comprising a taper-roller thrust and radial bearing 174, a taper-roller pre-load bearing 175, and a pre-loading collar 176 with buttress threads, screwed on to the stub 166.

The diaphragm element, 171, of the blade root carries an inboard extension 177, which is coaxial with the blade root and is connected to a pitch-change torque tube 178 by a universal joint, 179, 180, 181 centred on the drag pivot axis.

The inboard end of the torque-tube 178 is supported by means of a needle roller bearing 185 on a stud 184, screwed into the drag link 157; and the torque-tube has an integral lever 186 whose forked end carries spherical seating elements 187 of a ball joint, of which the ball 188 is formed on the end of a vertical link 189, as shown in Fig. 8, which also shows that the other end of the link 189 is connected by a ball joint 190 with one of the arms 147 of a spider 146, mounted on a pillar 138, which can be raised or lowered bodily for collective pitch control by mechanism, not shown, operated by rotation of the pulley 104 (105 or 106).

The centre of the ball joint 187, 188 is aligned in plan on the axis of the flapping pivot pin 156, thus obviating any inter-action between flapping and pitch angle, and this alignment is maintained, notwithstanding displacements of the blade on the drag pivot by the circumstance that the alignment of the torque-tube 178 with respect to the drag link is maintained constant by the spigot bearing 184, 185, and the universal joint 179—181, centred on the drag pivot axis, which joint accommodates displacements about the last named axis, while transmitting pitch-changing displacements to the rotor blade.

For completeness, the yawing controls are also shown in part although the invention is not concerned with them as such. The cockpit end of the yawing control circuit is shown in Fig. 7 and comprises a "rudder" bar 107 pivoted at 108 in a bracket 109 and operating a push-pull rod 111 by means of a crank 110. The rod 11 is connected to mechanism, not shown, for applying rotation to the pulleys 125, 126 shown in Fig. 8 which are fitted on the two side-by-side rotor hub-assemblies 34, 37 and 35, 38 only. The pulleys 125, 126 operate mechanism, not shown, housed within the gear boxes 34, 35 and pillars 138 for rocking the spiders 146 of the side-by-side rotors 24, 25 in opposite directions in the pitching plane of the aircraft to apply cyclic pitch control equally and oppositely in this plane to these two rotors, for which purpose the spiders 146 of these two rotors are trunnion-mounted on the pillars (trunnions not shown).

It is to be understood that the accompanying drawings, illustrative of a specific example of apparatus embodying the invention, are not to scale and are mainly of a purely conventional nature; no significance is to be attached to the dimensions of any part shown, nor are these drawings in any way to be looked on as a guide to detail design, except in so far as the text of the description may otherwise direct.

We claim:

1. In an aircraft having at least three sustaining rotors arranged to rotate on spaced generally upright axes offset in different directions from the center of gravity of the aircraft, a flight-control system which comprises in combination with control means, a spider or like member which can be tilted about any horizontal axis and has as many arms or linkage pick-up points as there are rotors, which arms or pick-up points are disposed in plan in corresponding relationship to the lines joining the several rotor centres to the c. g. of the aircraft, and independent control circuits operated by the control means for displacing the spider or like member in the pitching and rolling planes respectively, each of said spider arms or pick-up points being connected to means for varying the lift of the corresponding rotor, in such a way that the control system is "isotropic" in the sense herein defined.

2. A flight-control system of an aircraft as claimed in claim 1, in which the spider or like member can be raised and lowered bodily by means of a control circuit connected thereto, which last-named circuit is independent of those for tilting the spider or like member and is operated by a separate control member corresponding in function to the conventional "pitch-lever" or "throttle-lever," the connections of the spider arms or pick-up points to the lift-varying means of the rotors being such that bodily raising or lowering of the spider or like member alters the magnitude of the resultant lift vector of all the rotors without displacing it.

3. In an aircraft having at least three variable pitch sustaining rotors arranged to rotate on spaced generally upright axes offset in different directions from the center of gravity of the aircraft, a control system comprising a control member mounted for vertical displacement and for tilting movement in all directions, the several rotors being connected with said member at different sides thereof to receive pitch control motions therefrom, a control organ for vertically displacing said member, and a control organ movable in one sense for tilting said member laterally and in another sense for tilting said member longitudinally of the aircraft.

CYRIL GEORGE PULLIN.
KENNETH WATSON.

REFERENCES CITED

The following references are of record in the file of this patent:

UNITED STATES PATENTS

| Number | Name | Date |
|---|---|---|
| 1,540,706 | Oehmichen | June 1, 1925 |
| 1,749,471 | De Bothezat | Mar. 4, 1930 |
| 1,844,786 | Nelson | Feb. 9, 1932 |
| 1,909,845 | Nagler | May 16, 1933 |
| 2,318,260 | Sikorsky | May 4, 1943 |

FOREIGN PATENTS

| Number | Country | Date |
|---|---|---|
| 495,510 | France | July 2, 1919 |
| 637,938 | France | Feb. 13, 1928 |
| 155,974 | Switzerland | Oct. 1, 1932 |